United States Patent
Lucas

(10) Patent No.: US 11,787,497 B1
(45) Date of Patent: Oct. 17, 2023

(54) SEMI-RECUMBENT BICYCLE WITH INTEGRATED SEAT AND STEERING SYSTEM

(71) Applicant: IntoWorld LLC, Red Wing, MN (US)

(72) Inventor: Christopher Lucas, Red Wing, MN (US)

(73) Assignee: Bike Different, Red Wing, MN (US)

( * ) Notice: Subject to any disclaimer, the term of this patent is extended or adjusted under 35 U.S.C. 154(b) by 0 days.

(21) Appl. No.: 18/129,860

(22) Filed: Apr. 1, 2023

Related U.S. Application Data

(60) Provisional application No. 63/326,549, filed on Apr. 1, 2022.

(51) Int. Cl.
*B62K 21/16* (2006.01)
*B62J 6/056* (2020.01)
*B62K 3/00* (2006.01)

(52) U.S. Cl.
CPC .............. *B62K 21/16* (2013.01); *B62J 6/056* (2020.02); *B62K 3/005* (2013.01)

(58) Field of Classification Search
CPC ........... B62K 21/16; B62K 3/005; B62J 6/056
See application file for complete search history.

(56) References Cited

U.S. PATENT DOCUMENTS

| | | | |
|---|---|---|---|
| 3,104,129 | A | 9/1963 | Mack |
| 4,283,070 | A | 8/1981 | Forrestall et al. |
| 5,069,469 | A | 12/1991 | Rosengrant et al. |
| D323,306 | S | 1/1992 | Brummer |
| 5,607,171 | A | 3/1997 | Labranche |
| 6,260,919 | B1 | 7/2001 | Yates |
| 6,532,962 | B1 | 3/2003 | Walker et al. |
| 7,537,286 | B2 | 5/2009 | Walker et al. |
| 9,321,496 | B2 | 4/2016 | Curless |
| 10,435,102 | B2 | 10/2019 | White |
| 11,142,274 | B1 | 10/2021 | Thompson |
| 2012/0272777 | A1* | 11/2012 | Tolhurst ................ B62K 21/16 74/491 |
| 2018/0000667 | A1* | 1/2018 | Simons ................ A61G 5/023 |
| 2019/0290512 | A1* | 9/2019 | Simons ................ A61G 5/022 |
| 2021/0237825 | A1* | 8/2021 | Gu ........................... B62K 3/02 |

FOREIGN PATENT DOCUMENTS

| | | |
|---|---|---|
| CA | 2175715 A1 | 11/1997 |
| DE | 202018006315 U1 | 1/2020 |
| KR | 101881518 B1 | 7/2018 |
| WO | WO2003095294 A1 | 11/2003 |

\* cited by examiner

*Primary Examiner* — Kevin Hurley
*Assistant Examiner* — Marlon A Arce
(74) *Attorney, Agent, or Firm* — Headland Law & Strategy; Matthew J. Smyth

(57) ABSTRACT

A steering system may include a seat assembly, a frame assembly and a wheel. The frame assembly may include a steering tube that is rotatably disposed within a head tube with a cam at a top end and a pair of forks at a bottom end to which is coupled an axle of the wheel. An arm may be disposed on and rotatably coupled to the seat assembly, and rotatably coupled to a left armrest and right armrest. A steering rod may be coupled to the cam and to one of the arms, the left armrest or the right armrest, such that forward movement of one of the armrests causes the steering rod to be translated forward and the cam to rotate in one direction, and backward movement of the same armrest causes the steering rod to be translated backward and the cam to rotate in an opposite direction.

20 Claims, 15 Drawing Sheets

SEMI-RECUMBENT BICYCLE WITH INTEGRATED SEAT AND STEERING SYSTEM

CROSS-REFERENCE TO RELATED APPLICATIONS

This application claims the benefit of U.S. Provisional Application Ser. No. 63/326,549, titled "Semi-Recumbent Bicycle with Integrated Seat and Steering System," filed on Apr. 1, 2022. This application incorporates the entire contents of the foregoing application herein by reference.

TECHNICAL FIELD

Various implementations relate generally to recumbent or semi-recumbent bicycle systems.

BACKGROUND

Recumbent bicycles differ from traditional upright bicycles in that the cyclist sits in a reclined or slightly reclined position and gains leverage by pushing his or her back against a seat while pedaling a crankset that is generally more forward than in a traditional upright bicycle.

SUMMARY

In some implementations, a steering system for a bicycle includes a seat assembly, a frame assembly and a wheel. The frame assembly may include a top tube having an aft end and a fore end, a head tube having a top end and a bottom end, and a steering tube having a top end and a bottom end. A first end of the head tube may be coupled to the fore end of the top tube, and the steering tube may be rotatably disposed within the head tube such that the top end of the steering tube extends above the top end of the head tube and the bottom end of the steering tube extends below the bottom end of the head tube. The steering tube may include at its bottom end a pair of forks, each fork in the pair coupled to an axle of the wheel; and the steering tube may further include at its top end a cam. The steering system may include a first arm and second arm, each of which is disposed on and rotatably coupled to the seat assembly. The seat assembly may be slidably coupled to the top tube such that its position can be adjusted between the aft end of the top tube and fore end of the top tube. The steering system may include a left armrest and right armrest, each of which may be rotatably coupled to the first arm and the second arm, such that the first arm, second arm, left armrest and right armrest form a parallelogram. A steering rod may be disposed substantially parallel to the top tube and coupled to the cam and to one of the first arm, the second arm, the left armrest or the right armrest. The left armrest and right armrest may each be configured to support a forearm of a rider of the bicycle when the rider is seated upright in the seat assembly.

Forward translation of the steering rod relative to the fore end of the top tube may cause the steering tube to rotate in a first direction, and backward translation of the steering rod relative to the fore end of the top tube may cause the steering tube to rotate in a second direction that is opposite the first direction.

In some implementations, each of the left armrest and right armrest may be coupled to the seat assembly with a leaf spring; in other implementations, each of the left armrest and right armrest may be coupled to the seat assembly with a first spring component and a second spring component. The first spring component may include two sheet members coupled at an angle, and the second spring component may include a curved section. A flexibility of the first spring component may be less than a flexibility of the second spring component.

Top surfaces of the left armrest and right armrest may be disposed above a top surface of a seat portion of the seat assembly. At least one of the left armrest and right armrest may further include a shifter that controls shifting of a derailleur associated with a drive system of the bicycle. At least one of the left armrest and right armrest may include controls for a directional indicator. Each of the left armrest and right armrest may include (a) a hand grip, (b) a brake lever, and (c) a surface configured to support the forearm of a cyclist on the bicycle in a position that is substantially parallel to the top tube.

In some implementations, a steering system for a semi-recumbent bicycle includes a seat assembly, a frame assembly and a wheel. The frame assembly may include a top tube having an aft end and a fore end, a head tube having a top end and a bottom end, and a steering tube having a top end and a bottom end. A first end of the head tube may be coupled to the fore end of the top tube, and the steering tube may be rotatably disposed within the head tube such that the top end of the steering tube extends above the top end of the head tube and the bottom end of the steering tube extends below the bottom end of the head tube. The steering tube may include at its bottom end a pair of forks, each fork in the pair coupled to an axle of the wheel; and the steering tube may further include at its top end a cam. At least one arm may be disposed on and rotatably coupled to the seat assembly. A left armrest and right armrest may each be rotatably coupled to the at least one arm. A steering rod may be disposed substantially parallel to the top tube and coupled to the cam and to one of the at least one arm, the left armrest or the right armrest, such that forward movement of one of the left armrest or right armrest causes the steering rod to be translated forward and the cam to rotate in one direction, and backward movement of the same one of the left armrest or right armrest causes the steering rod to be translated backward and the cam to rotate in an opposite direction. The left armrest and right armrest may each be configured to support a forearm of a rider of the bicycle when the rider is seated upright in the seat assembly.

Each of the left armrest and right armrest may be further coupled to the seat assembly with a first spring component and a second spring component. The first spring component may include two sheet members coupled at an angle, and the second spring component may include a curved section. Flexibility of the first spring component may be less than a flexibility of the second spring component. Top surfaces of the left armrest and right armrest may be above a top surface of a seat portion of the seat assembly. At least one of the left armrest and right armrest may include a shifter that controls shifting of a derailleur associated with a drive system. At least one of the left armrest and right armrest may include controls for a turn-signal indicator indicator or a front or rear light.

The seat assembly may be slidably coupled to the top tube such that its position can be adjusted between the aft end of the top tube and fore end of the top tube.

In some implementations, a steering system for a bicycle includes a seat assembly, a frame assembly and a wheel. The frame assembly may include a top tube having an aft end and a fore end, a head tube having a top end and a bottom end, and a steering tube having a top end and a bottom end. A first end of the head tube may be coupled to the fore end of the top tube, and the steering tube may be rotatably disposed within the head tube such that the top end of the steering tube extends above the top end of the head tube and the bottom end of the steering tube extends below the bottom end of the head tube. The steering tube may include at its bottom end a pair of forks, each fork in the pair coupled to an axle of the wheel; and the steering tube may further include at its top end a cam. An arm may be disposed on and rotatably coupled to the seat assembly. The steering system may further include a left armrest and right armrest, each of which is rotatably coupled to the arm. A steering rod may be disposed substantially parallel to the top tube and coupled to the cam and to one of the arm, the left armrest or the right armrest. Top surfaces of the left armrest and right armrest may be above a top surface of a seat portion of the seat assembly.

The seat assembly may be slidably coupled to the top tube such that its position can be adjusted between the aft end of the top tube and fore end of the top tube.

Forward translation of the steering rod relative to the fore end of the top tube may cause the steering tube to rotate in a first direction, and backward translation of the steering rod relative to the fore end of the top tube may cause the steering tube to rotate in a second direction that is opposite the first direction.

Each of the left armrest and right armrest may be further coupled to the seat assembly with a first spring component and a second spring component. The first spring component may include two sheet members coupled at an angle, and the second spring component may include a curved section.

DETAILED DESCRIPTION

Described herein is a semi-recumbent bicycle design that can, in some implementations, be employed by a cyclist as a means of urban transportation. Implementations are designed to be safe, comfortable, fast, efficient, easy to ride, healthy and an eco-friendly alternative to other forms of transportation. As used herein, "semi-recumbent" refers to a design in which the cyclist rider sits slightly farther behind the pedals than on a conventional upright bicycle (as is the case with a traditional recumbent bicycle); however, the cyclist remains more above the pedals than in many traditional recumbent bicycle designs, and the position of the cyclist may be more upright (e.g., closer to a sitting position than a reclining position, though possibly with some recline).

The semi-recumbent designs described and illustrated herein may have a "compact long wheelbase" design in which the front wheel is in front of the crank; however, the frames are generally shorter than so-called "long wheelbase" bicycles. As such, the designs described and illustrated herein are intended to be agile and easy to handle on congested streets, where quick maneuvers may be required. A steeper head tube angle relative to other designs can make the design nimble and put a cyclist in a safer, more ergonomic, upright, heads-up position. A larger rear wheel (e.g., 24" diameter) relative to a smaller front wheel (e.g., 16" diameter) can further optimize the upright position of the cyclist and contribute to a more responsive, nimble, maneuverable steering design. A design with a smaller 24" diameter rear wheel compared to 26" to 29" diameter wheels commonly found on adult bicycles lowers the seat position, which may also enable cyclists of various sizes to be able to rest their feet flatly on the ground at a stop. Other implementations may employ systems that are described herein in a different manner. For example, the steering systems described and illustrated herein may be employed in a recumbent or semi-recumbent bicycle having a front drive wheel and back steering wheel or wheels.

Figure 1:
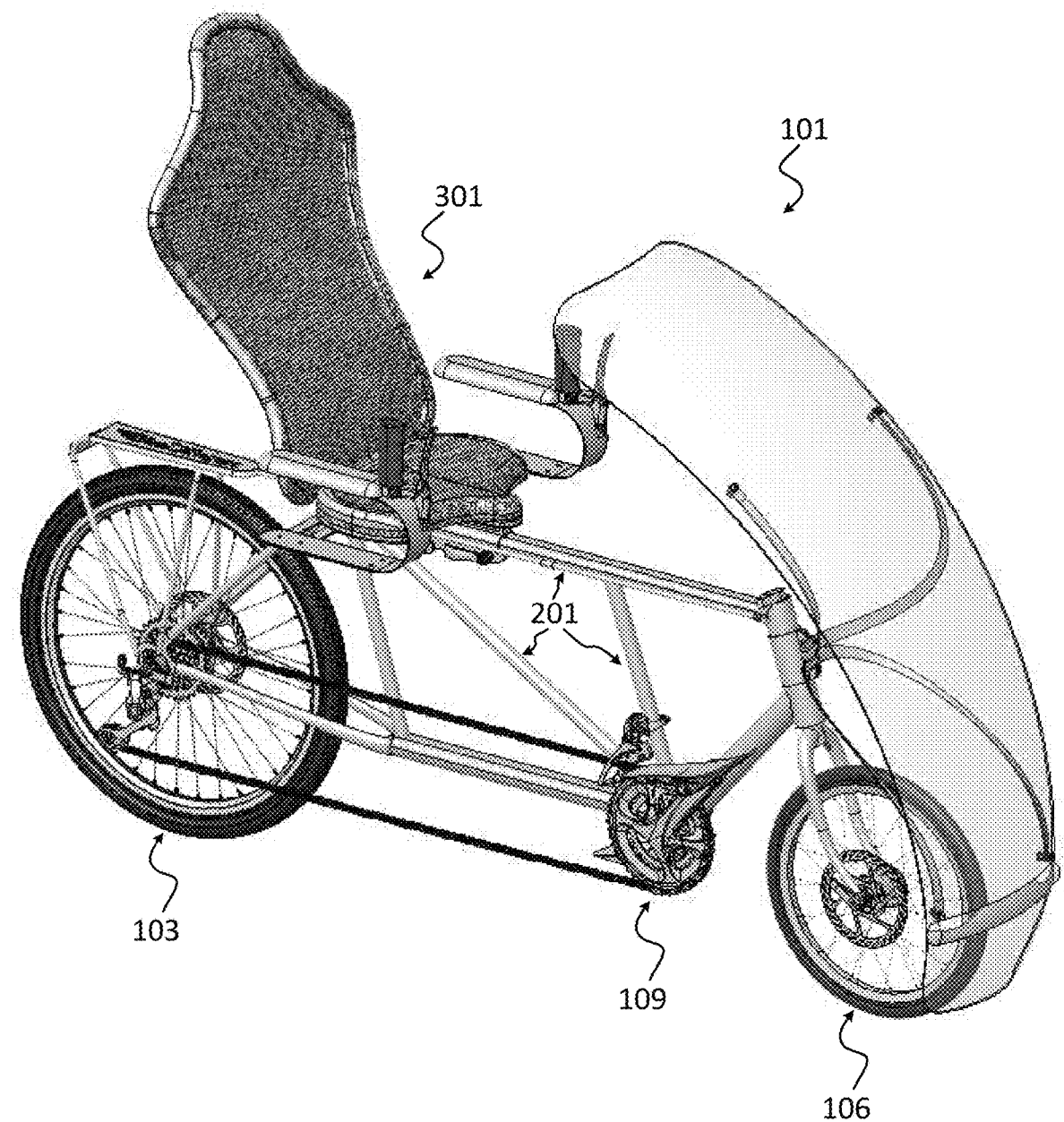
FIG. 1 is a perspective view of an exemplary semi-recumbent bicycle.

FIG. 1 is a perspective view of a semi-recumbent bicycle 101, according to one implementation. As shown, the semi-recumbent bicycle 101 includes a rear wheel 103; a front wheel 106; a crankset 109; a frame assembly 201; and a seat assembly 301. In some implementations, as shown, the rear wheel 103 is larger than the front wheel 106. In other implementations, the rear wheel 103 and front wheel 106 may be the same size; in still other implementations, the front wheel 106 may be larger than the rear wheel 103.

Figure 2A:
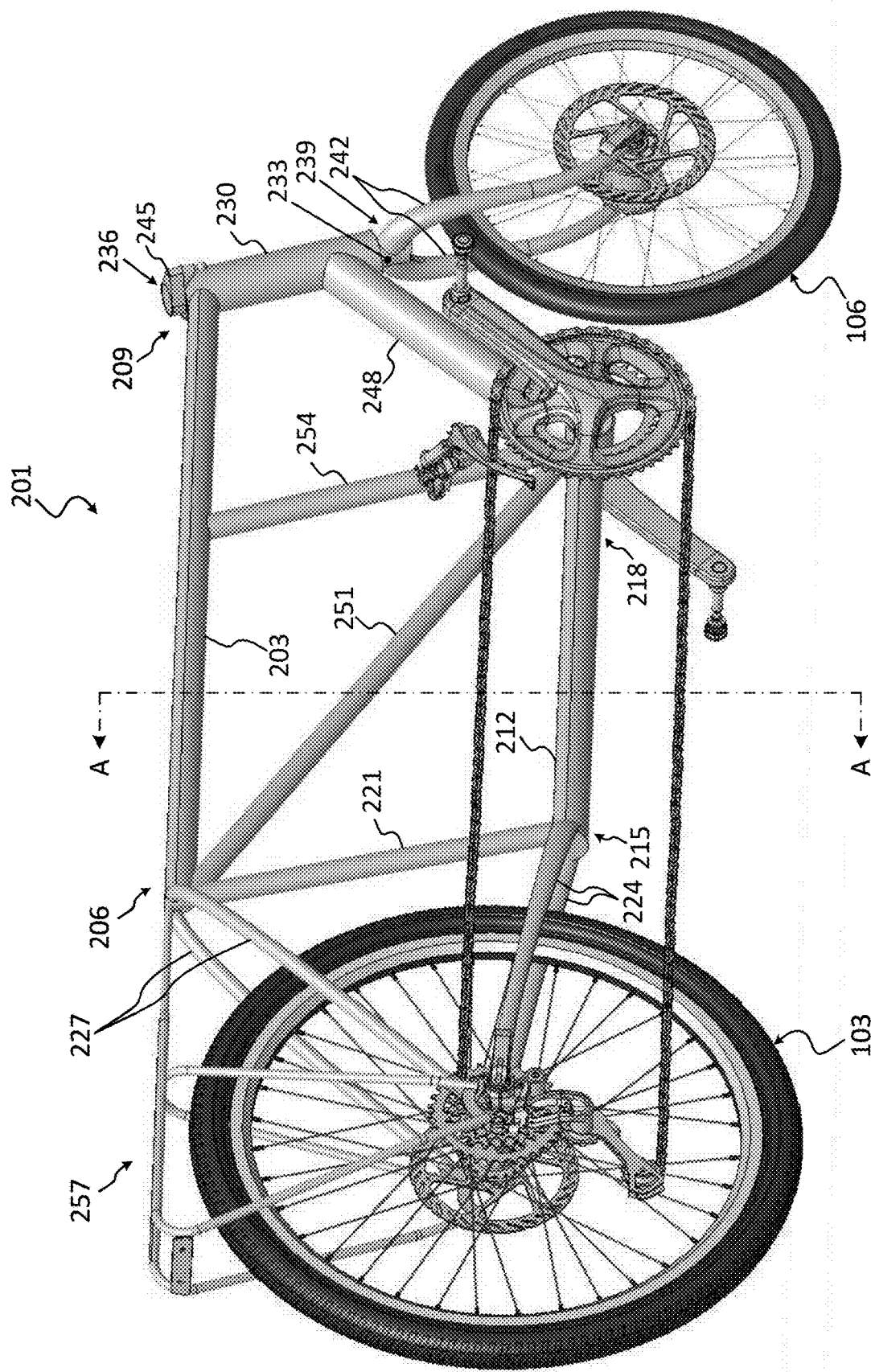
FIG. 2A is a perspective view of a frame assembly in the exemplary semi-recumbent bicycle of FIG. 1.

FIG. 2A is a perspective view of the frame assembly 201. As shown in one implementation, the frame assembly includes a top tube 203 having an aft end 206 and a fore end 209. The frame also includes a bottom tube 212 having an aft end 215 and a fore end 218. A seat tube 221 couples the aft end 206 of the top tube 203 to the aft end 215 of the bottom tube 212. A pair of chain stay tubes 224 are coupled to the aft end 215 of the bottom tube 212 and intersect a pair of seat stay tubes 227 that are coupled to the aft end 206 of the top tube 203. The rear wheel 103 is mounted to the frame assembly 201 at the intersection of the chain stay tubes 224 and seat stay tubes 227. More specifically, though not shown in detail in FIG. 2A, an axle for the rear wheel 103 is mounted at the intersection of the chain stay tubes 224 and seat stay tubes 227. As shown in one implementation, the seat tube 221, chain stay tubes 224 and seat stay tubes 227 form a triangle.

As shown, the frame assembly 201 includes a head tube 230 that is coupled to the fore end 209 of the top tube 203. A steering tube 233 is rotatably disposed inside the head tube 230 and has a top end 236 and a bottom end 239. At the bottom end 239, the steering tube 233 is joined to a pair of forks 242, to which is rotatably mounted the front wheel 106. In some implementations, as shown, the top end 236 of the steering tube 233 extends above the head tube 230 and terminates with a cam 245 that couples to a steering system 401 (see FIG. 4A), as described in more detail below.

As shown, a down tube 248 connects the head tube 230 to the bottom tube 212. Additional tubes and structures may be provided for stability or other purposes. For example, as shown, the frame assembly 201 includes a torsion tube 251 connecting the aft end 206 of the top tube 203 to the bottom bracket housing the crankset axle (not shown, behind the crankset chainrings), and a crank tube 254 (e.g., for providing additional support and for mounting a front derailleur). Also shown is a pannier rack 257 that may be permanently integrated with the frame assembly 201 or otherwise attached to the frame assembly 201.

In some implementations, various tubes and components of the frame assembly 201 may be made from a variety of materials, which may include steel, carbon steel, aluminum alloy, chromoly (chrome molybdenum-alloyed) steel or other steel alloys, titanium alloy, magnesium alloy, carbon fiber-epoxy composites, or another material or combination of materials. In general, material selection may balance performance, strength, weight, cost, ease of construction and other factors. In some implementations, overall weight of the semi-recumbent bicycle 101 may be 30 pounds or less.

Figure 2B:
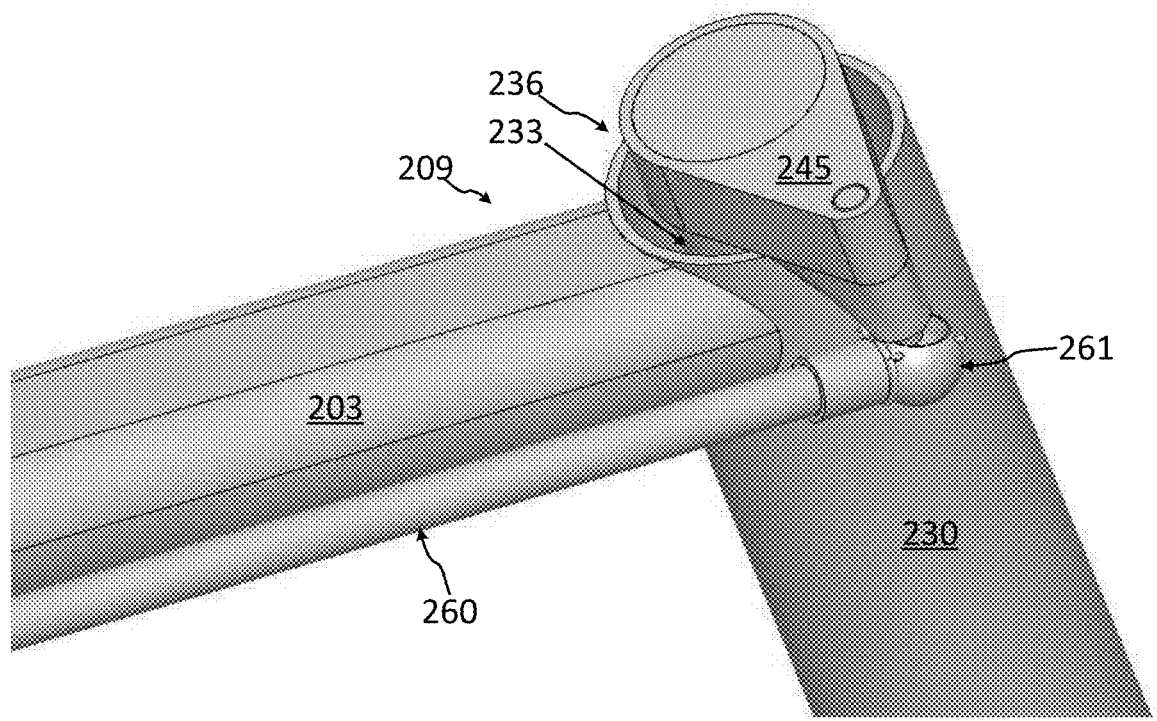
FIG. 2B illustrates additional detail of a head tube and steering tube shown in FIG. 2A.

FIG. 2B illustrates additional detail of the head tube 230 and steering tube 233 that is rotatably disposed therein. In some implementations, as shown, a steering linkage tube (a "steering rod") 260 is coupled to the cam 245 (e.g., with a ball-and-socket joint 261), which is itself coupled to the top end 236 of the steering tube 233. As shown, forward translation of the steering linkage tube 260, relative to the fore end 209 of the top tube 203, causes the cam 245 to be twisted forward and counterclockwise, causing the steering tube 233 to be rotated within the head tube 230 counterclockwise; similarly, backward translation of the steering linkage tube 260, relative to the fore end 209 of the top tube 203, causes the cam 245 to be twisted backward and clockwise, causing the steering tube 233 to be rotated within the head tube 230 clockwise.

Figure 2C:
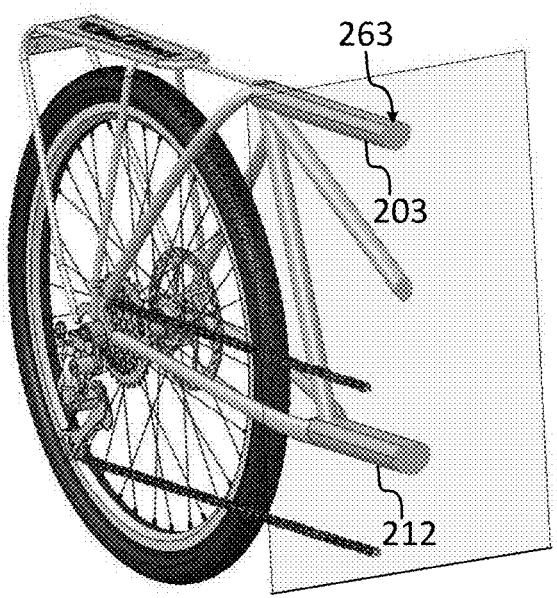
FIG. 2C is a perspective cross-sectional view of a portion of the frame assembly shown in FIG. 2A.
Figure 2D:
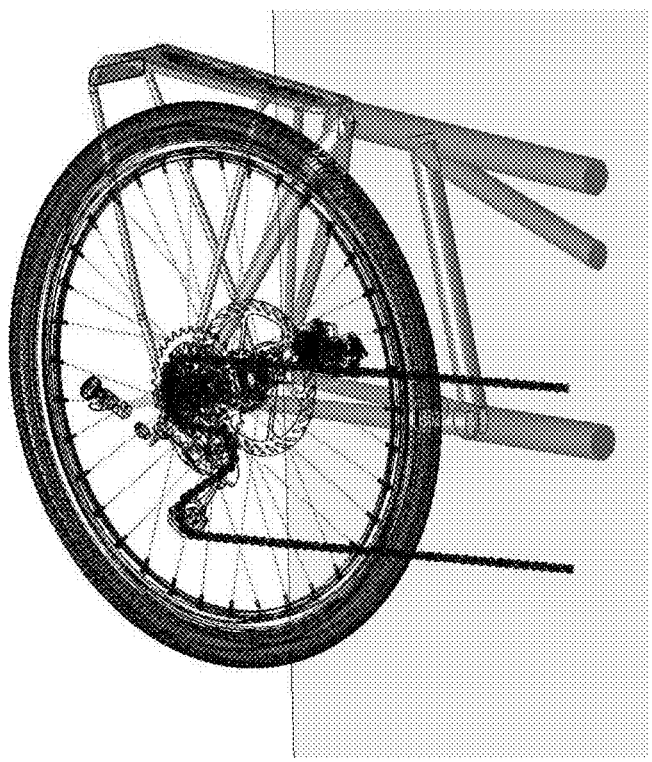
FIG. 2D is a perspective cross-sectional view of a portion of another exemplary frame assembly.

In some implementations, some tubes may have circular cross sectional profiles, and other tubes may have different cross sectional profiles. FIG. 2C is a perspective cross section, taken along line A-A in FIG. 2A, showing two possible cross sections for tubes in the frame assembly 201. For example, in some implementations, the top tube 203 (and/or bottom tube 212) may have a generally circular or elliptical (oval) cross section with a flat top surface 263. Tube shapes could also be square, rectangular, teardrop, or other shapes. In some such implementations, the flat surface 263 may facilitate the securing of other components to the top tube 203, as will be described in more detail below. FIG. 2D is perspective cross section, showing other possible cross sections for tubes in the frame (e.g., circular cross sections for the top and bottom tubes).

Figure 3A:
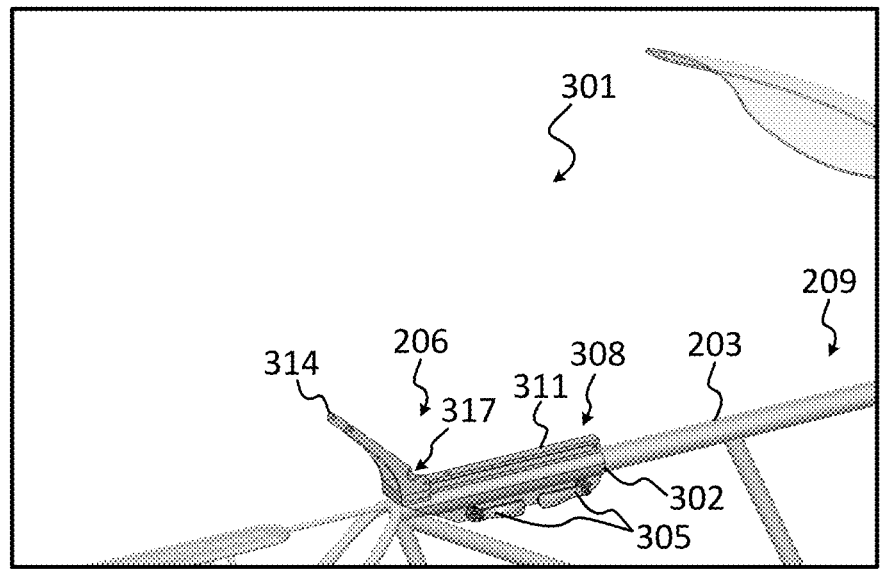
FIGS. 3A-3G illustrate details of an exemplary seat assembly.
Figure 3B:
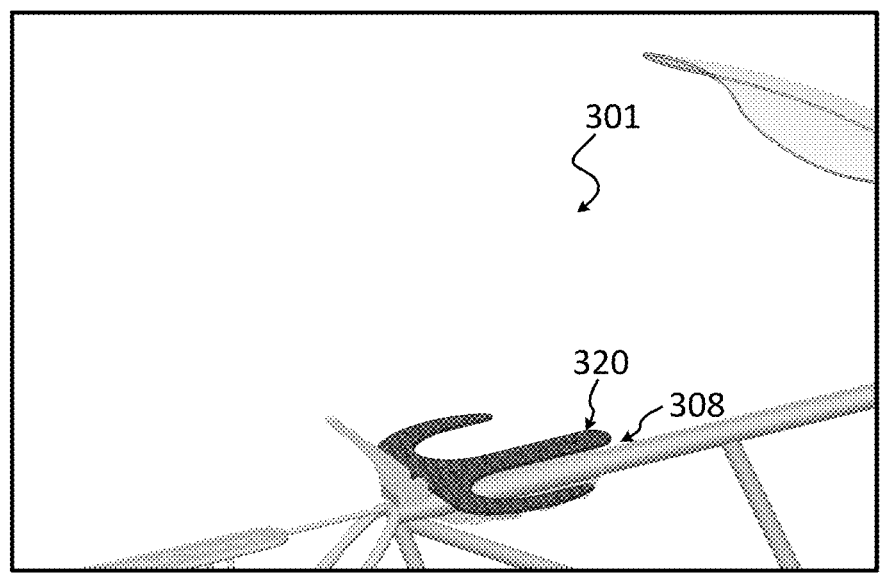
Figure 3C:
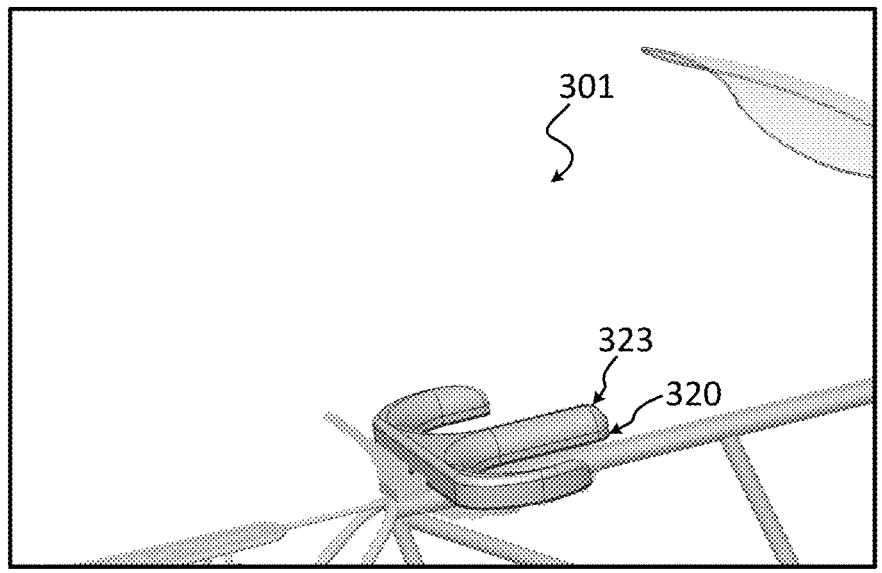
Figure 3D:
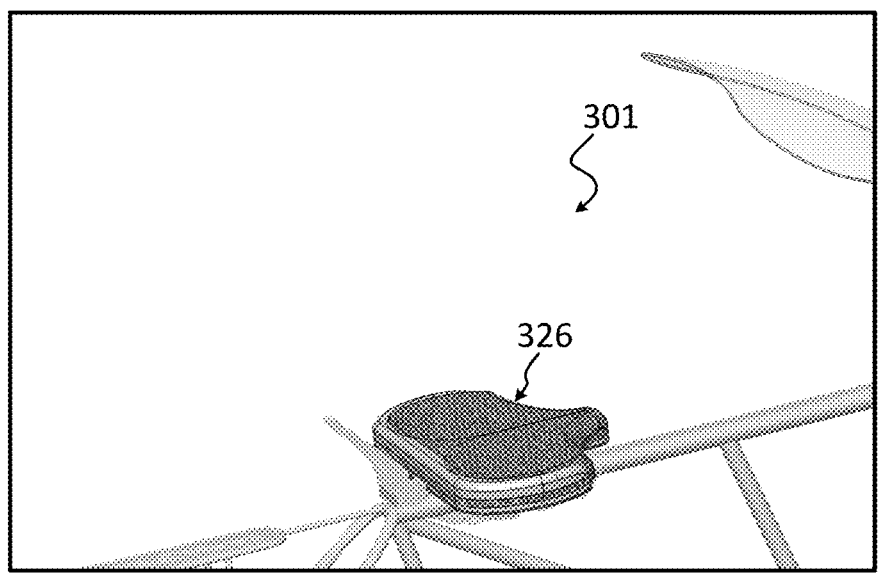
Figure 3E:
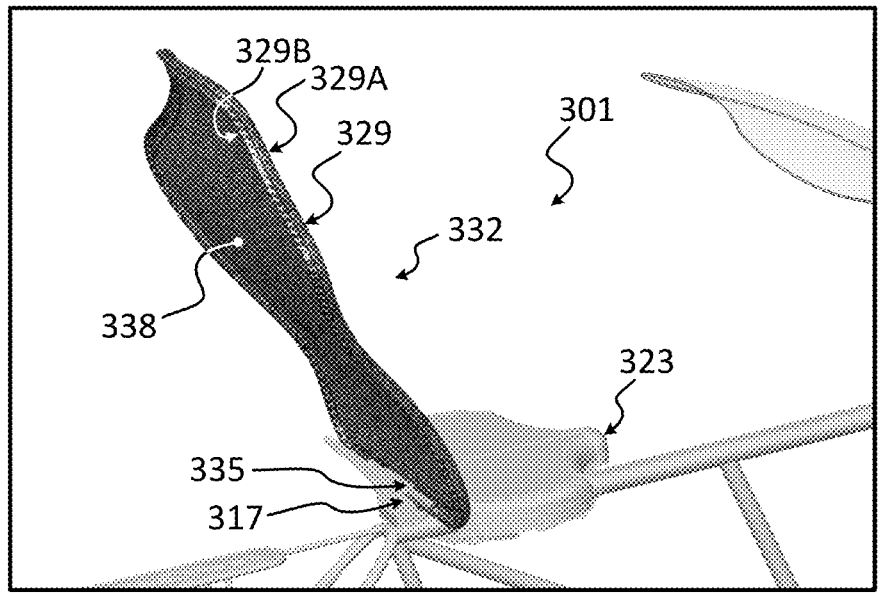
Figure 3F:
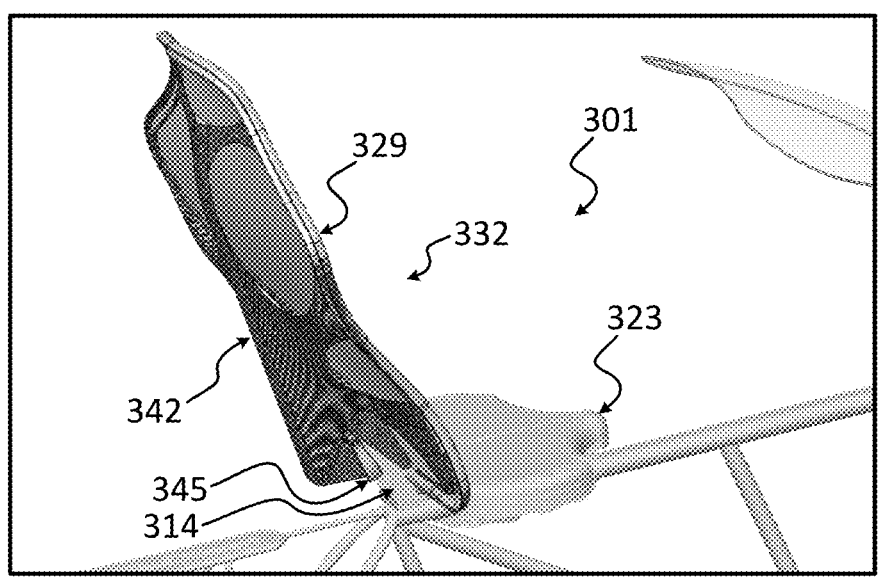
Figure 4A:
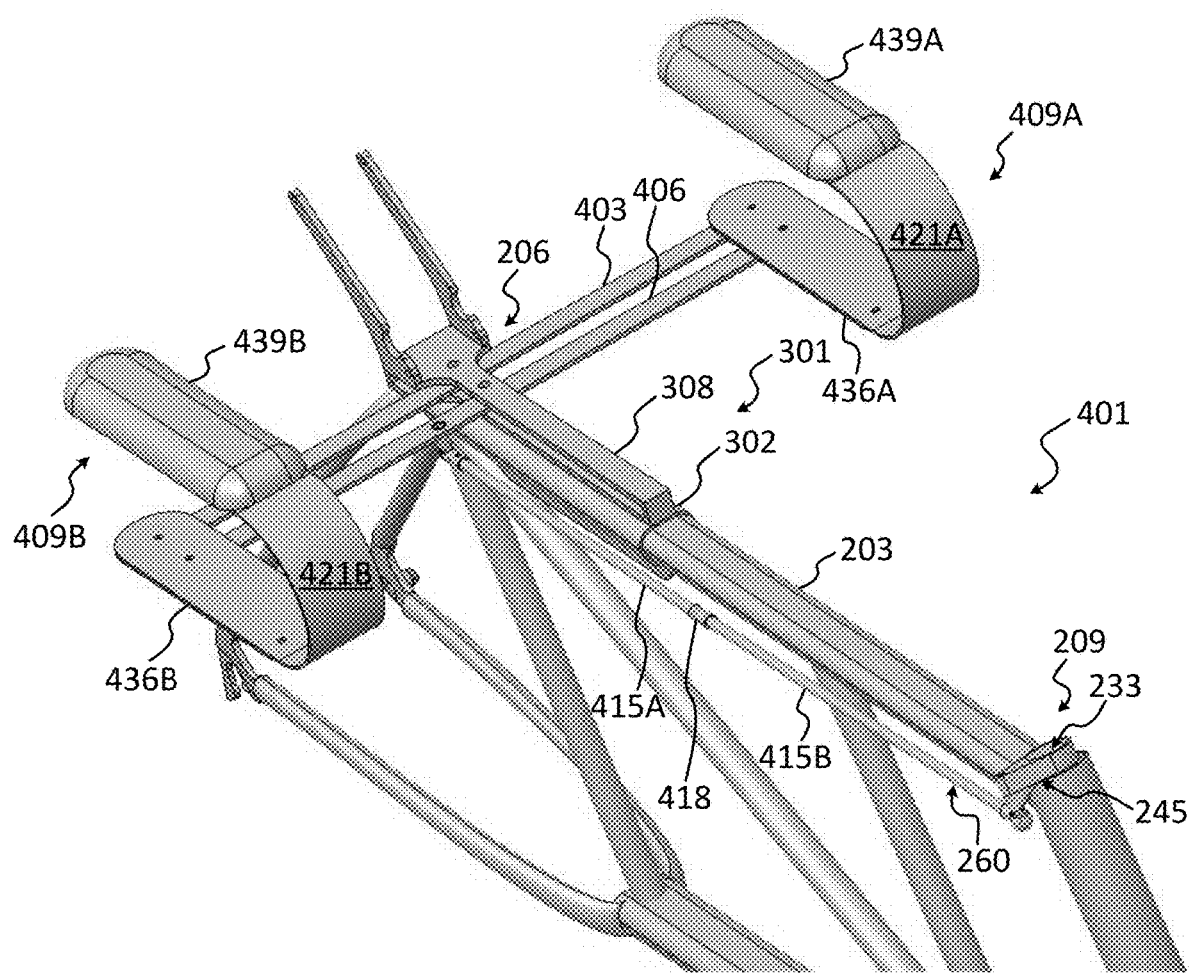
FIGS. 4A-4C illustrate details of exemplary steering systems.

FIGS. 3A-3F illustrates details of an exemplary seat assembly 301, which, in some implementations, is associated with the steering system 401 (see FIG. 4A). As illustrated in FIG. 3A, the seat assembly 301 includes a top tube clamp or clamps 302. In some implementations, the top tube clamp 302 encircles the top tube 203, and adjustable fasteners 305—when in a clamping orientation (as shown)—securely fix the top tube clamp 302 to the top tube 203. The adjustable fasteners 305 (e.g., quick-release cam levers) may be released, in an adjusting orientation, allowing the top tube clamp 302 to be translated along the top tube 203 between the aft end 206 and the fore end 209 of the top tube 203. In this manner, a position along the top tube 203 for the seat assembly 301 can be adjustably fixed.

Coatings or other materials may be employed to facilitate adjustment and locking of the top tube clamp 302 relative to the top 203. For example, the top tube clamp 302 may have a low-friction polytetrafluoroethylene (PTFE, or Teflon®) coating (or another low-friction material) on the inner top surface of the clamp; such that the top tube clamp 302 easily moves along the top tube 203 while a cyclist is adjusting it; but the inner side surfaces of the top tube clamp 302 may have a high-friction rubberized or soft plastic surface that helps hold the top tube clamp 302 to the top tube 203 when the fasteners 305 are secured. This same approach of selectively employing low-friction and high-friction materials or coatings can be employed with other moving parts—such as in the seat assembly 301 or with a telescoping steering linkage tube 260 (see FIG. 4A).

The seat assembly 301 also includes a seat base 308. The bottom flat surface of seat base 308 is affixed to the top flat surface of top tube clamp 302. In some implementations, as shown, the seat base 308 has a top flat surface 311 that is parallel to the top tube 203, and cantilevered brackets 314 that extend rigidly at a fixed angle relative to the flat surface 311. In some implementations, the brackets 314 include a notch 317 that can receive another seat component (see below). A seat base plate 320, made of various materials such as steel alloy, aluminum alloy, carbon fiber-epoxy composite, or other suitable material may be disposed on the seat base 308, as shown in FIG. 3B.

Turning to FIG. 3C, the seat assembly 301 may further include a seat base pad 323 that is disposed on the seat base plate 320. In some implementations, the seat base pad may be made from soft, cushioning, shock-absorbing materials such as polyurethane foam, a gel-based memory foam, 3D-printed polymers which may have a honeycomb infill pattern (an example of which is shown in FIG. 3G), or similar materials. As shown in an exemplary implementation in FIG. 3C, the seat base plate 320 and seat base pad 323 have a three-pronged 'W' (or "ram's head") shape, with a back structural member and three perpendicular structural "arms" that are configured to support a cyclist's legs while at the same time facilitating reciprocal motion and comfort of the cyclist's legs during pedaling.

As illustrated in FIG. 3D, the seat base pad 323 may be covered with a mesh material 326 that provides further support and comfort for a cyclist's legs. In some implementations, the mesh material is a polyester, nylon, spandex, cotton, other synthetic polymer, usually woven fabric, or some combination of the foregoing. The mesh material 326 may be stretched around the perimeter of seat base pad 323 and seat base plate 320. The mesh material 326 may be secured tightly to the seat with a drawstring hem in the mesh material 326 underneath the seat (not shown).

Turning to FIG. 3E, the seat assembly 301 may further include a seatback frame 329 that is ergonomically shaped to conform to a cyclist's back curvature. Seat back frame 329 includes a peripheral support member that encircles the perimeter of the seatback 332. The seat back frame 329 may be made from carbon fiber-epoxy composite or other suitable material. The seatback frame 329 may include a pivot tube assembly 335 at its base that interfaces with the notch 317 to permit the seatback 332 to pivot about an axis formed by the pivot tube assembly 335 and notch 317, such that an angle of the seatback 332 relative to the seat base pad 323 can be adjusted. The seatback 332 may also include a breathable mesh material 338 similar to mesh material 326 that covers seat base pad 323 and seat base plate 320 and can be stretched around the seat back frame 329, to provide a cyclist with a comfortable, ventilated back rest.

In some implementations, tension or stiffness of the mesh material 338 may be adjustable in one or more places (e.g., at a point corresponding to a lumbar region of a cyclist's back, or a point corresponding to an upper back/thoracic portion of a cyclist's back, or a point corresponding to a lower neck/cervical portion of a cyclist's back, or at multiple of the foregoing points). For example, some implementations (not shown), may include wheel/pulley/string spooling systems or threaded-sleeve systems for applying greater or lesser tension to different portions of the seat back frame 329 to adjust tension of the mesh material 338 at different points. Such implementation of separate adjustments to mesh material 338 tension would allow a cyclist to tighten the mesh material 338 to increase support and leverage against seat back 332 or loosen the mesh material 338 to increase back comfort.

Figure 3G:
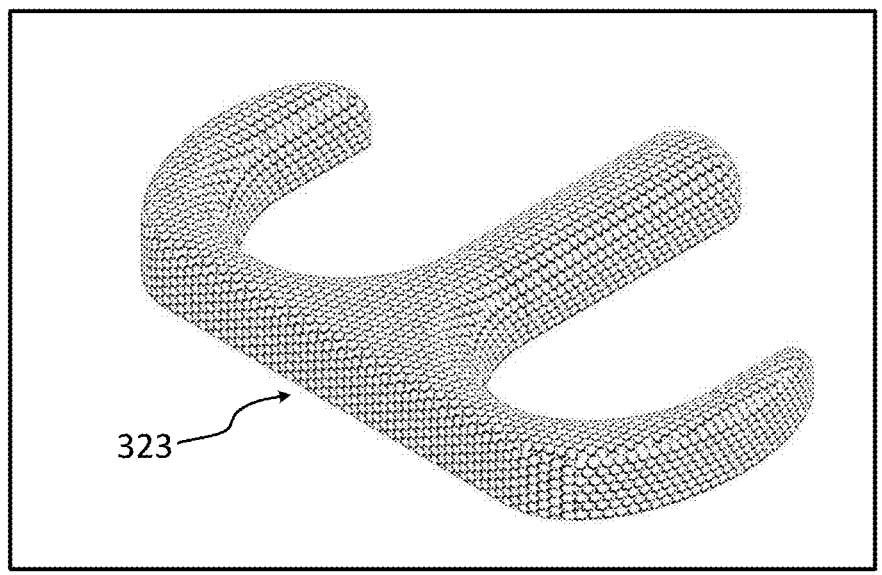

Turning to FIG. 3F, the seat assembly 301 may further include a seat back brace 342 that supports the seat back frame 329 at multiple points and that interfaces with the brackets 314. In some implementations, the seat back brace 342 is adjustably secured to the brackets 314 with a seat locking mechanism 345 (e.g., an adjustable quick-release cam lever), such that the angle of the seat back 332 relative to the seat base pad 323 can be adjusted and locked into place. In some implementations, as shown, the seat back brace 342 has an arc-shaped slot or aperture that facilitates a range of motion for the seat back along an arc whose maximum tilt-back point occurs where the pivot tube assembly 335 comes in contact with notch 317 (see previous figures). The range of motion may extend from 90° (fully upright) to 135° or more from horizontal (a 45° recline from vertical). Such a range of motion can provide comfort to a cyclist, while still giving the cyclist sufficient contact with and leverage from seat back 332 while pedaling, and a clear view ahead.

In some implementations, the seat assembly 301 provides cyclists with a balance between performance and comfort. The seat assembly 301 can be designed to hold cyclists firmly in place while offering a cool flow-through ventilation design. Memory foam or other shock-absorbing components similar to those in seat base pad 323 may be added to the perimeter of seat back 332. In some implementations, no struts are required to support the seat back, thereby providing ample unobstructed storage space for items behind the seat back 332 (e.g., on a pannier rack 257), even when the seat back 332 is fully reclined.

In some implementations, the seat back may be constructed as follows: two separate fiberglass-epoxy composite molds may be made (e.g., from 3D models in the negative shape of the desired seat back frame 329—specifically of an outer member 329A (see FIG. 3E) and an inner member 329B). Another mold can be made for the seat back brace 342. Layers of woven carbon fiber sheets and thermoset epoxy may be laid up over recesses in each mold to form the structural parts. Once the carbon fiber-epoxy components are cured and removed from their respective molds, mesh material 338 may be stretched tight between the outer member 329A and inner member 329B, then the two members 329A and 329B may be bonded together to hold mesh material 338 tightly in place. The seat back brace 342 may be bonded to the inner member 329B/outer member assembly to provide structural back support.

Figure 3H:
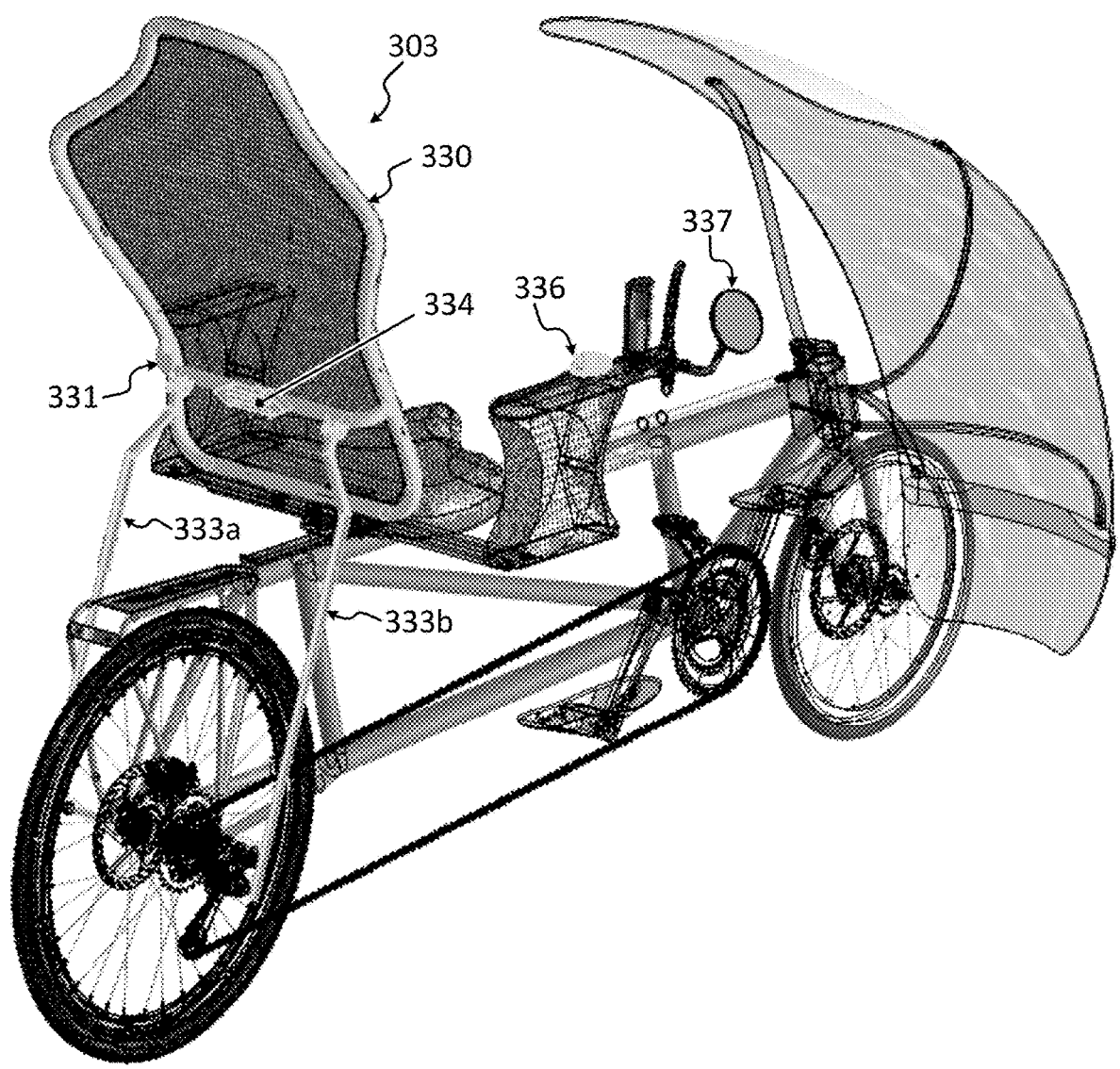
FIG. 3H illustrates details of another exemplary seat assembly.

FIG. 3H illustrates details of another exemplary seat assembly 303. As shown, the seat assembly 303 includes a seat back frame 330 that includes a horizontal support 331; and telescoping and locking support tubes 333a and 333b couple to the horizontal support 331 and anchor the seat back frame 330 to the frame (e.g., near the rear axle, as shown). In some implementations, locking members (e.g., twist locks that fix two portions of the tube to each other; set screws, thumb screws, etc.) enable the support tubes 333a and 333b to be extended or contracted, then locked, to releasably fix the angle of the seat.

Also shown in FIG. 3H is a rear tail light with directional turn signal indicator 334 disposed on the horizontal support 331, and controls 336 for the same, which, as shown, are disposed on a right armrest. In some implementations, the controls 336 comprise pushbuttons for activating a left or right portion of the indicator 334 (which, in some implementations, is a battery-powered LED or halogen indicator). The controls 336 may further include another pushbutton for activating a brake light in the indicator 334, which, in some implementations may comprise a middle portion of the indicator 334 and/or both right and left portions of the indicator 334. In some implementations, the indicator 334 may flash when it is activated. In some implementations, the controls 336 may comprise sensors that are integrated with the steering system and/or braking system, such that the indicator 334 is automatically activated when steering or braking operations are initiated. In some implementations, the controls 336 may further control a front or rear light. Also shown is a mirror 337 that may be disposed on one or both of the armrests.

FIG. 4A illustrates additional details of the steering system 401, which, in some implementations, is associated with the seat assembly 301 just described. In some contexts, a steering system that is disposed fully under a seat may be referred to as an under-seat steering system (USS); here, the design is modified relative to a traditional USS in that some components are disposed under the seat, but a cyclist actuates those components from above the seat (or base of the seat). In some implementations, this combination of an USS and OSS (over seat steering) system avoids the so-called "tiller effect", a problem some long wheelbase recumbent bicycles have that use so-called "ape hanger" (or "Easy Rider") style handlebars that swing out laterally when steering.

As shown in FIG. 4A, the steering system 401 includes a first steering linkage bar (or "arm") 403 and a second steering linkage bar (or "arm") 406, each of which is rotatably disposed at pivot points within a horizontal slot on the seat base 308. A left armrest assembly 409A and a right armrest assembly 409B upon which a cyclist rests his or her forearms while cycling are each rotatably coupled to the first steering linkage bar 403 and second steering linkage bar 406, such that together, the first steering linkage bar 403, second steering linkage bar 406, base 436A of the left armrest assembly 409A and base 436B of the right armrest assembly 409B form a parallelogram. In this implementation, a steering linkage tube (or "steering rod") 260 couples the second steering linkage bar 406 to the cam 245 that is disposed at the top of the steering tube 233. With this arrangement, forward translation of the right armrest assembly 409B (toward the fore end 209 of the top tube 203) actuates the cam 245 in a manner that causes counterclockwise rotation of the steering tube 233 (as viewed from above the steering tube 233); and forward translation of the left armrest assembly 409A (toward the fore end 209 of the top tube 203) actuates the cam 245 in a manner that causes clockwise rotation of the steering tube 233 (again, as viewed from above the steering tube 233). The steering system 401 allows a cyclist to move armrest assembly 409A and armrest assembly 409B with his or her forearms in a fore and aft motion parallel with top tube 203 to rotate steering tube 233. In other implementations, one of the first steering linkage bar 403 and second steering linkage bar 406 may be omitted; and only a single steering linkage bar may be employed.

As described above, the seat assembly 301 can be disposed at various points along the top tube 203 (e.g., by loosening the adjustable fasteners 305 that are disposed in the top tube clamp 302 (see FIG. 3A); translating the top tube clamp 302 and corresponding seat assembly 301 toward the fore end 209 or aft end 206 of the top tube 203, as desired; and tightening the adjustable fasteners 305 to lock the seat assembly 301 in the desired position). To facilitate this adjustment, the steering linkage tube 260 can include one or more telescoping sections, such as section 415A and section 415B, which can facilitate extension or contraction of the length of the steering linkage tube 260, as necessary to keep steering linkage bar 403 and steering linkage bar 406 perpendicular to and in alignment with the front wheel 106. A fastener (e.g., coupling ring) 418 may be employed to lock the sections 415A and 415B relative to each other, once the seat assembly 301 is locked at the desired position to the top tube 203.

Figure 4B:
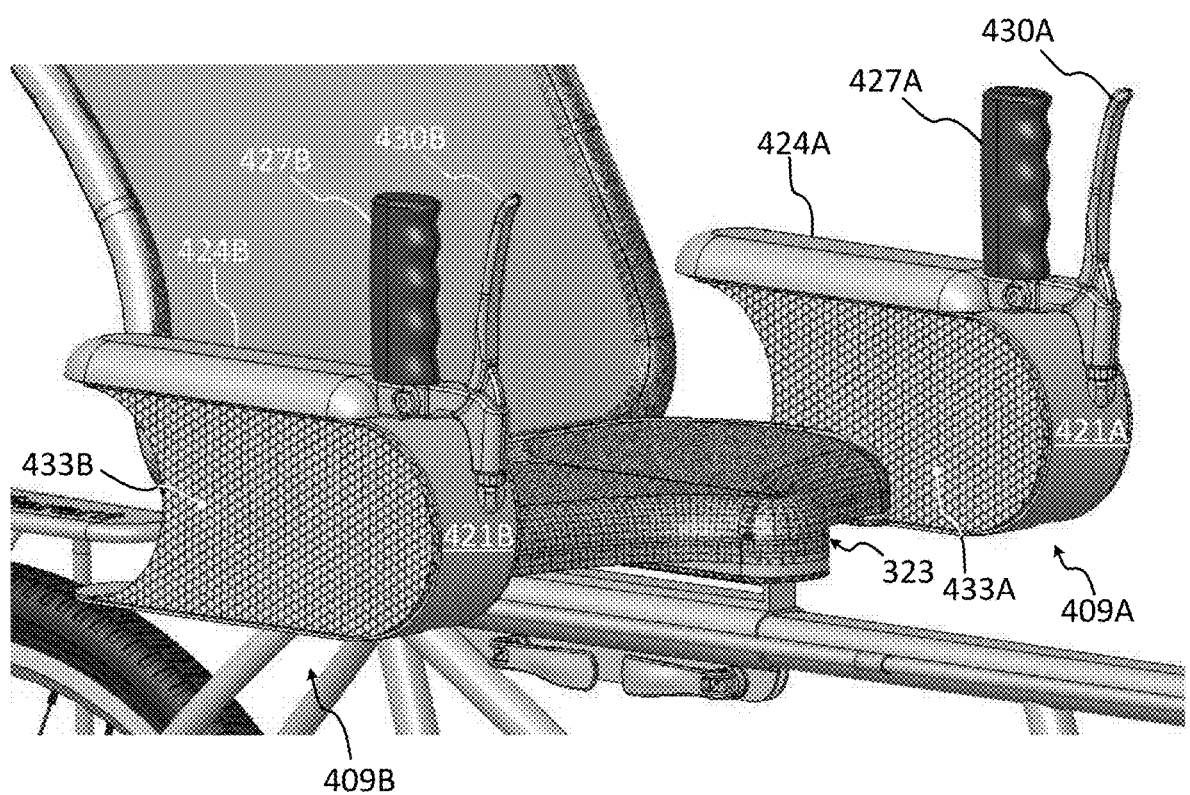

FIG. 4B illustrates additional detail of the armrests 409A and 409B. In some implementations, each armrest 409A and 409B has a similar structure, including, a leaf-spring component 421A and 421B, an armrest 424A and 424B, a handgrip 427A and 427B, and a brake actuator (brake lever) 430A and 430B. (As used herein, "leaf-spring component" refers to a structure of sheet material having a width that is greater than its thickness and configured to bend or flex in a direction substantially normal to its width—whether the sheet material is of a single layer, or whether the sheet material has a composite structure (e.g., as in the case of a typical leaf spring).) Handgrips 427A and 427B and brake actuators 430A and 430B may be affixed to leaf springs 421A and 421B in front of armrests 424A and 424B. The brake actuators 430A and 430B may be coupled to corresponding brakes on the front and rear wheels, respectively, via cables (not shown), as is customary. In some implementations, the handgrips 427A and 427B may be coupled to derailleur(s) on the (front) and/or rear wheels, respectively, via other cables (not shown), as is customary. For example, the handgrips 427A and 427B may be configured to be pivotable forward or backward, or twistable (e.g., clockwise or counterclockwise), to effectuate a shift in a respective derailleur position to shift gears.

In some implementations, each of the armrests 409A and 409B includes four parts: base plates 436A and 436B (e.g., of aluminum, carbon fiber-epoxy composite, plastic, another material; see FIG. 4A), which are each rotatably coupled to the first steering linkage bar 403 and second steering linkage bar 406 to form a parallelogram; U-shaped "leaf springs" 421A and 421B; and armrest pads 439A and 439B. In some implementations, the armrest pads 439A and 439B include two components: a structural support member, which may be constructed similarly to the seat base pad 323 (e.g., in some implementations, with a shock-absorbing material such as polyurethane foam, memory foam, a 3D-printed polymer, or similar material), and a cyclist contacting surface (e.g., a polyester mesh fabric similar to that used in mesh material 338).

In some implementations, the armrest base plates 436A and 436B may be made from approximately 3 mm thick 6061 grade aluminum plates. The leaf springs 421A and 421B may be molded from carbon fiber-epoxy composite sheets or other suitable materials. As in the aforementioned process for making a seat back, a pattern (e.g., wood or polymer) can be produced and coated with a release agent (e.g., polylactic acid, or PLA); woven carbon fiber sheets and an adhesive (e.g., an epoxy or thermoset epoxy) can be placed in layers on the pattern until a desired thickness is achieved. The construction can be cured, then removed from the pattern. Handgrips 427A and 427B and brake actuators 430A and 430B may be attached with traditional fasteners (e.g., screws, bolts, washers, rivets, etc.). In some implementations, carbon fiber leaf springs 421A and 421B may be approximately 2 mm thick and within a range of 6 to 9 cm wide. (As used herein, "about" or "approximately" can refer to within some tolerance, range or percentage of a nominal value, such as, for example, within 0.1%, 1%, 2%, 5%, 25%, 50%, etc. of the nominal value).

The armrest pads 439A and 439B may be made from a shock-absorbing material such as polyurethane foam, memory foam, a 3D-printed polymer, or similar material, and they may be disposed on a separate spring structure, in some implementations; and the armrest pads may be covered with a polyester mesh fabric or other suitable cyclist-contacting material. Cables associated with the handgrips 427A and 427B (e.g., for shifting derailleur(s)) and with the brake actuators 430A and 430B) may be routed around and affixed to the leaf springs 421A and 421B (cables not shown). A thermoset epoxy or other suitable adhesive or fastener system may be used to adhere various of the foregoing components to each other and to other portions of the semi-recumbent bicycle 101.

In some implementations, a material similar to that used in 433A and 433B (see FIG. 4B) is disposed in a space bounded by different portions of the leaf springs 421A and 421B. In some implementations, such material 433A and 433B can provide additional comfort to a cyclist who is sitting on the seat base pad 323 (e.g., by providing a feeling of increased support, protection and enclosure; and by helping to minimize contact between the cyclist and the leaf spring components 421A and 421B). In some implementations, the material 433A and 433B can provide damping that counteracts or balances the elasticity of the leaf-spring components 421A and 421B.

Figure 4C:
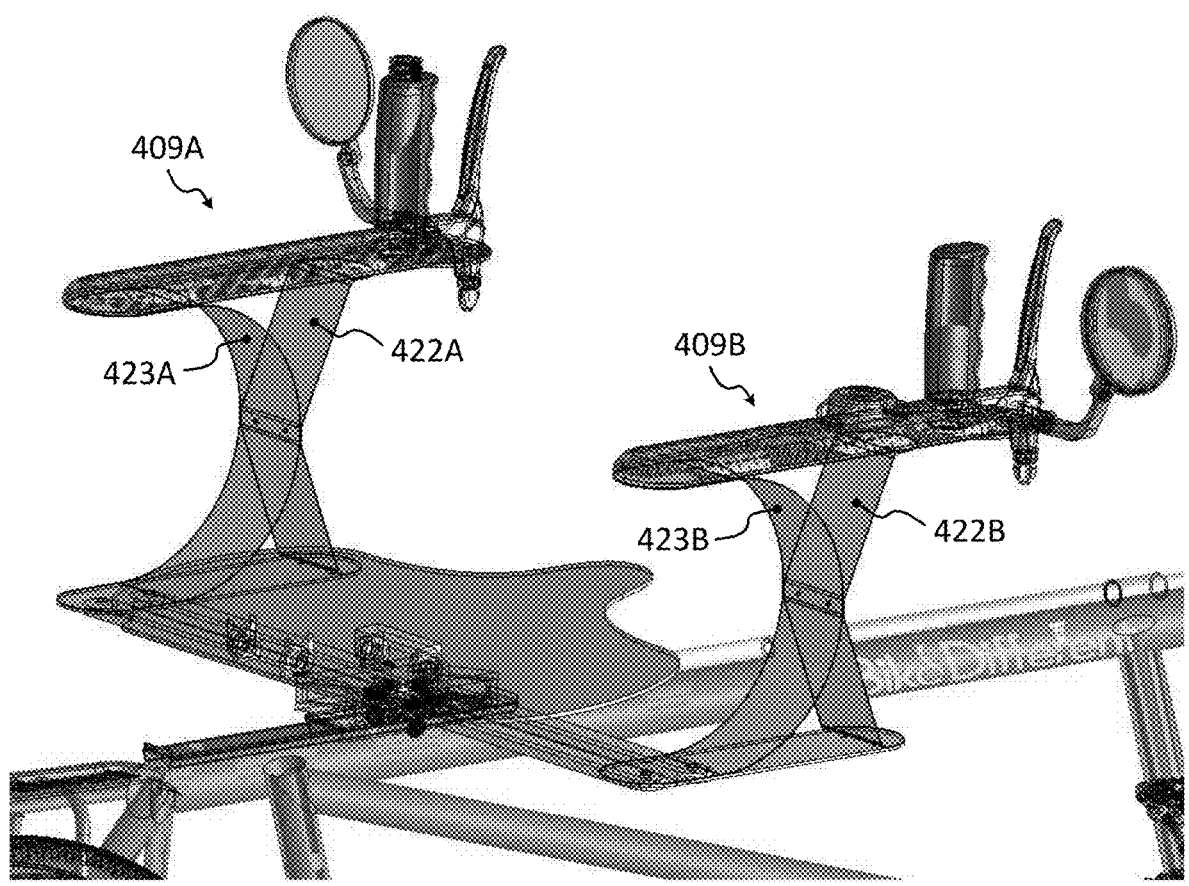

FIG. 4C illustrates details of another exemplary steering system. As shown in FIG. 4C, the leaf-spring components 421A and 421B shown in FIG. 4B may be replaced by front spring components 422A and 422B and back spring components 423A and 423B. In some implementations, as shown, the front spring components 422A and 422B may comprise two straight sections that are coupled at an angle; and the back spring components 423A and 423B may be curved, as shown, and coupled to the front spring components 422A and 422B in the middle. Moreover, the thickness or flexibility of the front spring components 422A and 422B may be different than that of the back spring components 423A and 423B. For example, the back spring components 423A and 423B may be more flexible (e.g., by design of the shape and/or material characteristics) than the front spring components 422A and 422B. In such implementations, the variation in flexibility may permit a back portion of the armrests 409A and 409B to have a "softer" feel, allowing a user to lower his or her elbows to a comfortable position; while the relatively stiffer front spring components 422A and 422B may provide some shock absorption and isolation of vibration while still providing relatively more support at the front portions of the armrests 409A and 409B.

Figure 4D:
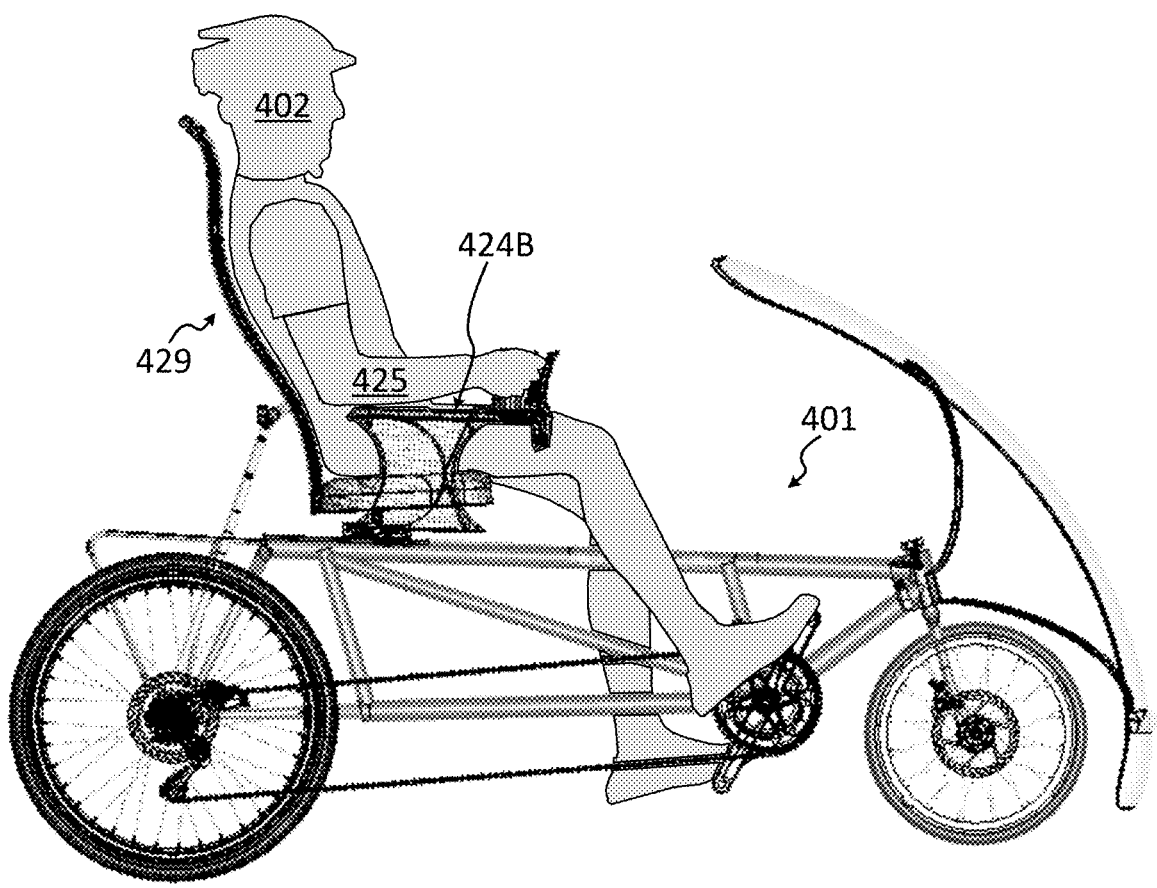
FIG. 4D illustrates a rider in an exemplary semi-recumbent bicycle.

FIG. 4D illustrates a rider 402 in an exemplary semi-recumbent bicycle 401. As shown, the rider 402 is able to lean against a seatback 429 while pedaling; and the armrests (e.g., armrest 424B) are configured to support the forearms (e.g., forearm 425) of the rider 402. To steer the semi-recumbent bicycle 401, the rider 402 may push one arm forward or the other, actuating the steering system as described above with reference to FIG. 4A.

Figure 4E:
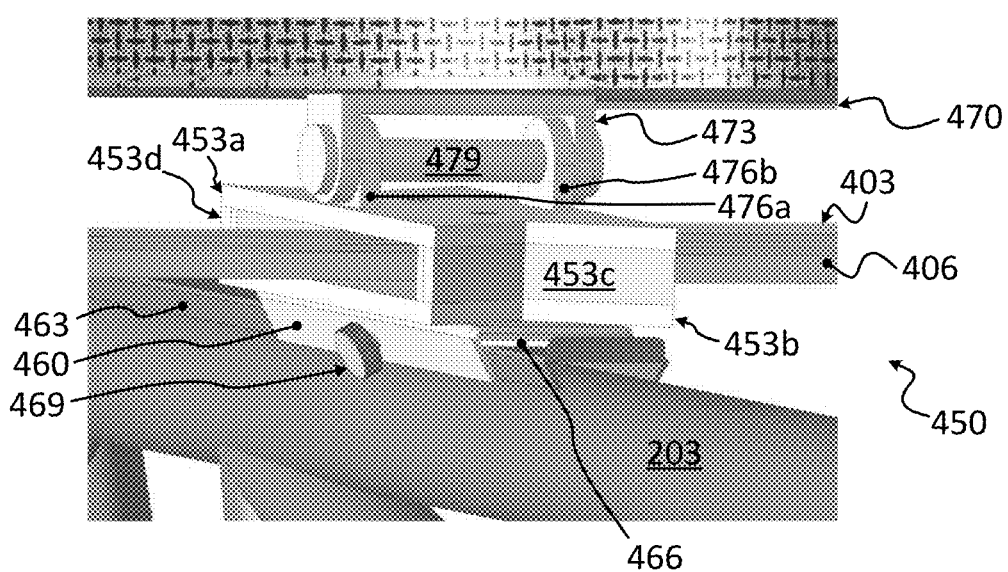
FIG. 4E illustrates another exemplary steering system.

FIG. 4E illustrates another exemplary steering system 450 that includes four plates 453a, 453b, 453c and 453d coupled (e.g., welded) together to form a rectangular box with two notches (including notch 456) on the fore and aft ends that control the maximum angle of rotation of the steering arms 403 and 406. Two low-friction (e.g., PTFE/Teflon®) layers) (not shown) between the top and bottom steering box plates 453a and 453b and the two steering arms 403 and 406 facilitate rotation of the steering arms 403 and 406.

In some implementations, the steering arms 403 and 406 rotate a total of 60° fore and aft, or 30° of rotation in each direction. Rubber-lined, notched walls 453c and 453d angled at 60° off the center plane inside the fore and aft ends of the steering box may prevent further rotation and collision of the steering arms 403 and 406 with each other and allow the steering tube (not shown in FIG. 4E—see element 260 in FIG. 4A) and front wheel to rotate 30° in either left or right direction.

FIG. 4E also shows details of a dovetail-shaped carriage 460. In some implementations, the carriage 460 slides lengthwise along the top tube on a dovetail-shaped rail 463 affixed to the top tube 203. A low-friction (e.g., PTFE/ Teflon®) layer 466 between the carriage 460 and rail 463 facilitates sliding action. A rider may loosen or tighten two set screws (including set screw 469), each one threaded into holes on the left and right sides of the carriage 460, to adjust and affix the fore and aft position of the seat assembly on the top tube in the rider's preferred position to accommodate different riders' leg length.

A seat base 470 may be attached to a seat box using a hinge assembly comprised of a top hinge plate 473 welded onto the bottom of the seat base 473, two bottom hinge tabs 476a and 476b welded onto the top of the steering box assembly, and a hinge bolt 479 running through holes in the hinge assembly, allowing the seat base 470 to tilt fore and aft, in combination with the sliding carriage 460 and rail 463, and the telescoping seat back support tubes.

Figure 5A:
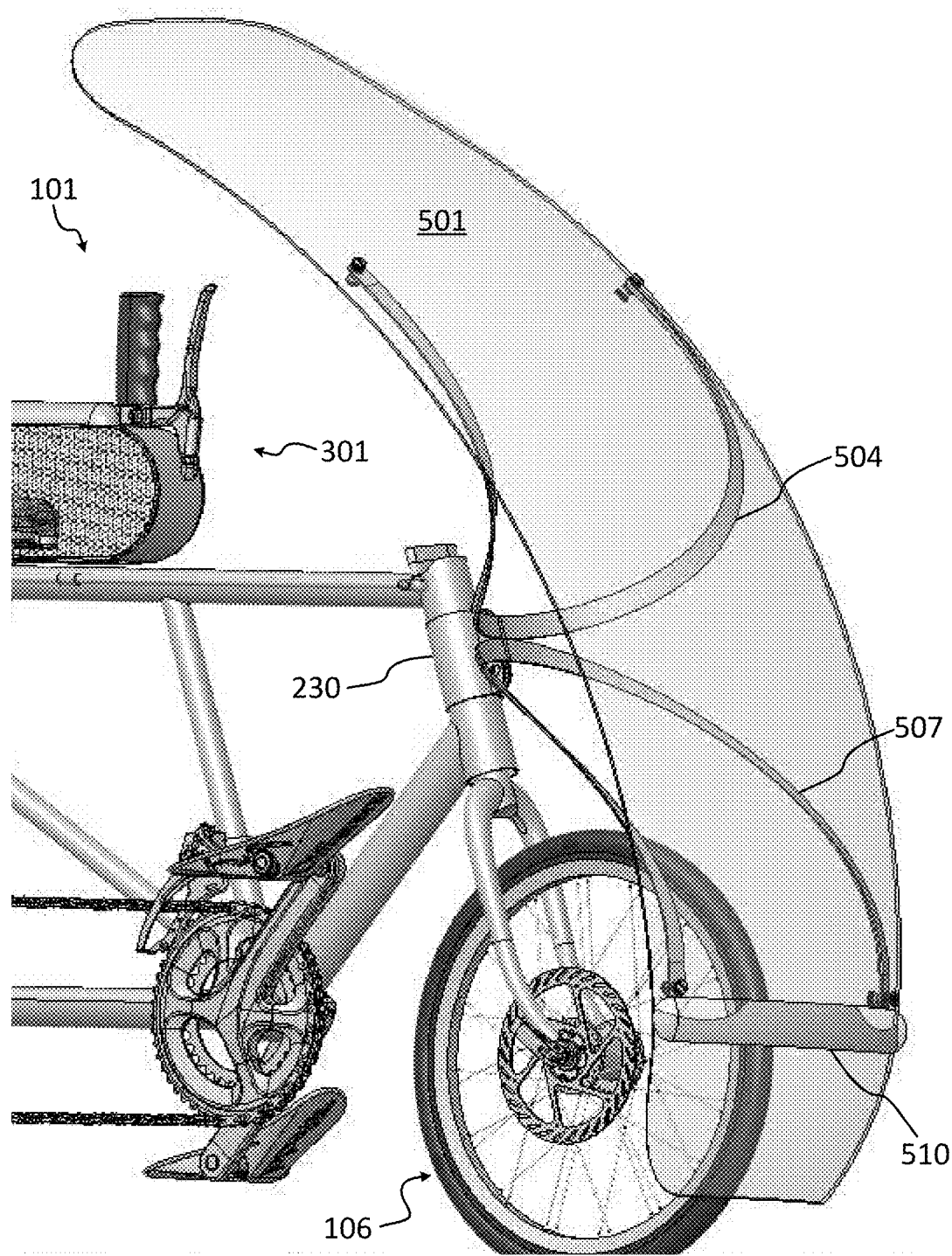
FIGS. 5A-5B illustrate details of an exemplary fairing.

FIG. 5A illustrates details of an exemplary fairing 501 (commonly referred to as a windshield) that may be provided. The fairing 501 may reduce aerodynamic drag and facilitate increased velocity (especially at higher speeds). In addition, the fairing 501 can provide some protection for a cyclist against elements (rain, wind, snow, hail), road dirt and debris.

As illustrated, the fairing 501 may be disposed in the front of the semi-recumbent bicycle 101. In some implementations, the fairing 501 is constructed of a polycarbonate plastic or other similar transparent or semi-transparent material. In some implementations, the polycarbonate plastic or other material is designed to be flexible, shatterproof or shatter resistant. The fairing 501 may be mounted to the semi-recumbent bicycle 101 with an upper wishbone-shaped support 504 and a lower wishbone-shaped support 507. In some implementations, as shown, the fairing 501 extends nearly to the ground (e.g., covering much of the front wheel 106 and thereby improving aerodynamic performance).

In some implementations, as shown, the fairing 501 includes a bumper 510. The bumper may be made of an elastic or compressible material that provides some shock absorption when the bumper 510 collides with another object. Additional shock absorption may be inherent in the design of the upper wishbone support 504 and lower wishbone support 507. For example, upon impact with another object, the upper and lower wishbone supports 504 and 507 may flex, allowing the fairing 501 to be pushed backwards toward the seat assembly 301, while, in the process, absorbing some of the force exerted by the impact. Additional shock absorption may be provided by the material of the fairing 501 itself. For example, the fairing 501 may be configured to deform in a non-destructive manner upon impact when made from flexible materials such as polycarbonate plastic. In some implementations, when made from other, less flexible materials, the fairing may be configured to deform in a destructive manner to absorb even more impact.

When present, the bumper 510 may include additional components. For example, in some implementations, the bumper 510 includes rechargeable battery-powered lights (headlights, LED light strips, indicator signals that may be actuated automatically when the steering system 401 is actuated to make a turn). In other implementations, other electronics may be disposed in the bumper 510, such as, for example, proximity detection equipment, radar or sonar equipment, or other sensors that may provide a cyclist with situational awareness and collision avoidance.

Figure 5B:
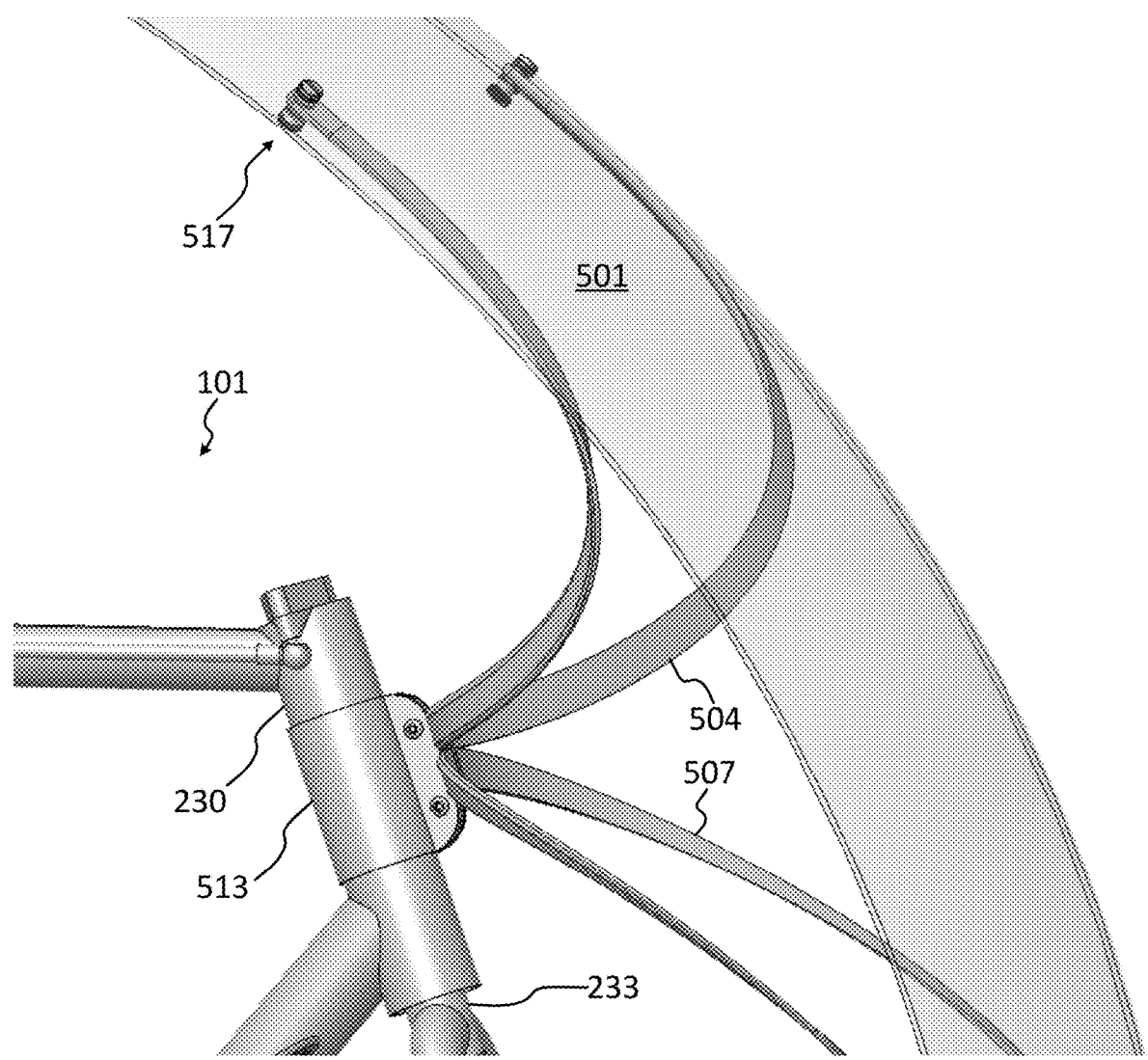

FIG. 5B illustrates additional details of how an exemplary fairing 501 can be mounted to a semi-recumbent bicycle 101. As shown, the upper wishbone support 504 and lower wishbone support 507 may be mounted to a bracket 513, which is itself mounted to the head tube 230. A fastening system 517 may be used to couple opposite ends of the wishbone supports 504 and 507 to the fairing 501. The fastening system 517 may include a bolt, locking nut or locking washer/nut combination, and rubber washers on either side of the fairing 501. In other implementations, another fastening system 517 may be used, such as a rivet, expanding rivet, adhesive, expandable plastic fastener, etc.

The upper wishbone support 504 and lower wishbone support 507 may be constructed of carbon fiber (e.g., molded and layered with thermoset epoxy, as described above with respect to other components); the upper wishbone support 504 and lower wishbone support 507 may also be constructed of twisted and formed metal stock (e.g., steel, aluminum, spring steel, etc.); the upper wishbone support 504 and lower wishbone support 507 may also be constructed of a polymer that balances rigidity and strength with some flexibility.

In implementations in which the fairing 501 is mounted to the head tube 230, rather than the steering tube 233), the fairing 501 remains substantially perpendicular to the longitudinal extent of the semi-recumbent bicycle 101, thereby providing additional protection to a cyclist on the semi-recumbent bicycle 101, even through execution of a turn. This implementation also lightens the load on the front steering system, making steering more nimble, quick and responsive. (As used herein, "substantially perpendicular to," "substantially parallel to," or "substantially normal to" may mean within 1 degree, 2 degrees, 5 degrees, 10 degrees, 25 degrees, 30 degrees or 45 degrees of perpendicular, parallel, or normal, respectively.)

Several implementations have been described with reference to exemplary aspects, but it will be understood by those skilled in the art that various changes may be made and equivalents may be substituted for elements thereof without departing from the contemplated scope. For example, various materials may be used, including metal alloys, polymers, carbon fiber-epoxy composites, or a combination thereof. In some implementations, described features may be present; while in other implementations, such features may be omitted. Dimensions may be altered relative to what is described or illustrated. Figures may not be to scale in some implementations. Wheel sizes may be varied. Crankset position may vary from what is illustrated herein. The frame assembly may have a different arrangement—with a greater or fewer number of support tubes, or with a different arrangement of those support tubes. Solid support members may replace tubes. The seat back may have a different form or shape (e.g., it may be taller, shorter, wider or narrower than shown), and it may be constructed differently (e.g., it may be made from different materials other than those shown). Other features may be added; for example, an electric motor may be coupled with the drivetrain to assist the cyclist with additional propulsion when pedaling.

Many other variations of how to make and use the structures described herein are possible, and modifications may be made to adapt a particular situation or material to the teachings provided herein without departing from the essential scope thereof. Therefore, it is intended that this description cover all aspects falling within the scope of the appended claims.

What is claimed is:

1. A steering system for a bicycle comprising:
    a seat assembly, a frame assembly and a wheel;
    the frame assembly comprising a top tube having an aft end and a fore end, a head tube having a top end and a bottom end, and a steering tube having a top end and a bottom end; wherein a first end of the head tube is coupled to the fore end of the top tube, and the steering tube is rotatably disposed within the head tube such that the top end of the steering tube extends above the top end of the head tube and the bottom end of the steering tube extends below the bottom end of the head tube; the steering tube comprising at its bottom end a pair of forks, each fork in the pair coupled to an axle of the wheel; and the steering tube further comprising at its top end a cam;
    a first arm and second arm, each of the first arm and second arm disposed on and rotatably coupled to the seat assembly, which seat assembly is slidably coupled to the top tube such that its position can be adjusted between the aft end of the top tube and fore end of the top tube;
    a left armrest and right armrest, each of the left armrest and right armrest rotatably coupled to the first arm and the second arm, such that the first arm, second arm, left armrest and right armrest form a parallelogram; and
    a steering rod disposed substantially parallel to the top tube and coupled to the cam and to one of the first arm, the second arm, the left armrest or the right armrest;
    wherein the left armrest and right armrest are each configured to support a forearm of a rider of the bicycle when the rider is seated upright in the seat assembly.

2. The steering system of claim 1, wherein forward translation of the steering rod relative to the fore end of the top tube causes the steering tube to rotate in a first direction and backward translation of the steering rod relative to the fore end of the top tube causes the steering tube to rotate in a second direction that is opposite the first direction.

3. The steering system of claim 1, wherein each of the left armrest and right armrest comprises (a) a hand grip, (b) a brake lever, and (c) a surface configured to support the forearm of a cyclist on the bicycle in a position that is substantially parallel to the top tube.

4. The steering system of claim 1, wherein each of the left armrest and right armrest are coupled to the seat assembly with a leaf spring.

5. The steering system of claim 1, wherein each of the left armrest and right armrest are coupled to the seat assembly with a first spring component and a second spring component; wherein the first spring component comprises two sheet members coupled at an angle, and wherein the second spring component comprises a curved section.

6. The steering system of claim 5, wherein a flexibility of the first spring component is less than a flexibility of the second spring component.

7. The steering system of claim 1, wherein top surfaces of the left armrest and right armrest are disposed above a top surface of a seat portion of the seat assembly.

8. The steering system of claim 1, wherein at least one of the left armrest and right armrest further comprise a shifter that controls shifting of a derailleur associated with a drive system of the bicycle.

9. The steering system of claim 1, wherein at least one of the left armrest and right armrest comprises controls for at least one of a front or rear light or a turn-signal indicator.

10. A steering system for a semi-recumbent bicycle comprising:
    a seat assembly, a frame assembly and a wheel;
    the frame assembly comprising a top tube having an aft end and a fore end, a head tube having a top end and a bottom end, and a steering tube having a top end and a bottom end; wherein a first end of the head tube is coupled to the fore end of the top tube, and the steering tube is rotatably disposed within the head tube such that the top end of the steering tube extends above the top end of the head tube and the bottom end of the steering tube extends below the bottom end of the head tube; the steering tube comprising at its bottom end a pair of forks, each fork in the pair coupled to an axle of the wheel; and the steering tube further comprising at its top end a cam;
    at least one arm disposed on and rotatably coupled to the seat assembly;
    a left armrest and right armrest, each of the left armrest and right armrest rotatably coupled to the at least one arm;
    a steering rod disposed substantially parallel to the top tube and coupled to the cam and to one of the at least one arm, the left armrest or the right armrest, such that forward movement of one of the left armrest or right armrest causes the steering rod to be translated forward and the cam to rotate in one direction, and backward movement of the same one of the left armrest or right armrest causes the steering rod to be translated backward and the cam to rotate in an opposite direction;
    wherein the left armrest and right armrest are each configured to support a forearm of a rider of the bicycle when the rider is seated upright in the seat assembly.

11. The steering system of claim 10, wherein each of the left armrest and right armrest are further coupled to the seat assembly with a first spring component and a second spring component; wherein the first spring component comprises two sheet members coupled at an angle, and wherein the second spring component comprises a curved section.

12. The steering system of claim 11, wherein a flexibility of the first spring component is less than a flexibility of the second spring component.

13. The steering system of claim 10, wherein top surfaces of the left armrest and right armrest are above a top surface of a seat portion of the seat assembly.

14. The steering system of claim 10, wherein at least one of the left armrest and right armrest further comprise a shifter that controls shifting of a derailleur associated with a drive system.

15. The steering system of claim 10, wherein at least one of the left armrest and right armrest further comprise controls for at least one of a front light, a tail light or a turn-signal indicator.

16. The steering system of claim 10, wherein the seat assembly is slidably coupled to the top tube such that its position can be adjusted between the aft end of the top tube and fore end of the top tube.

17. A steering system for a bicycle comprising:

a seat assembly, a frame assembly and a wheel;

the frame assembly comprising a top tube having an aft end and a fore end, a head tube having a top end and a bottom end, and a steering tube having a top end and a bottom end; wherein a first end of the head tube is coupled to the fore end of the top tube, and the steering tube is rotatably disposed within the head tube such that the top end of the steering tube extends above the top end of the head tube and the bottom end of the steering tube extends below the bottom end of the head tube; the steering tube comprising at its bottom end a pair of forks, each fork in the pair coupled to an axle of the wheel; and the steering tube further comprising at its top end a cam;

an arm disposed on and rotatably coupled to the seat assembly;

a left armrest and right armrest, each of the left armrest and right armrest rotatably coupled to the arm; and a steering rod disposed substantially parallel to the top tube and coupled to the cam and to one of the arm, the left armrest or the right armrest;

wherein top surfaces of the left armrest and right armrest are above a top surface of a seat portion of the seat assembly.

18. The steering system of claim 17, wherein the seat assembly is slidably coupled to the top tube such that its position can be adjusted between the aft end of the top tube and fore end of the top tube.

19. The steering system of claim 17, wherein forward translation of the steering rod relative to the fore end of the top tube causes the steering tube to rotate in a first direction and backward translation of the steering rod relative to the fore end of the top tube causes the steering tube to rotate in a second direction that is opposite the first direction.

20. The steering system of claim 17, wherein each of the left armrest and right armrest are further coupled to the seat assembly with a first spring component and a second spring component; wherein the first spring component comprises two sheet members coupled at an angle, and wherein the second spring component comprises a curved section.

\* \* \* \* \*